No. 820,699. PATENTED MAY 15, 1906.
H. BUTENSCHÖN.
MEANS FOR FORMING FLOATS FROM LOGS OF WOOD.
APPLICATION FILED AUG. 22, 1904.
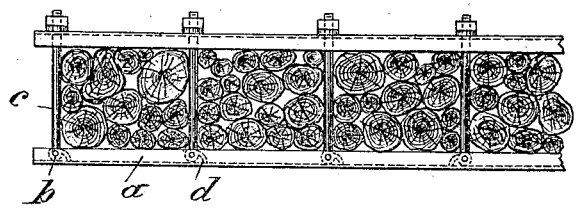
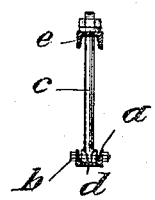
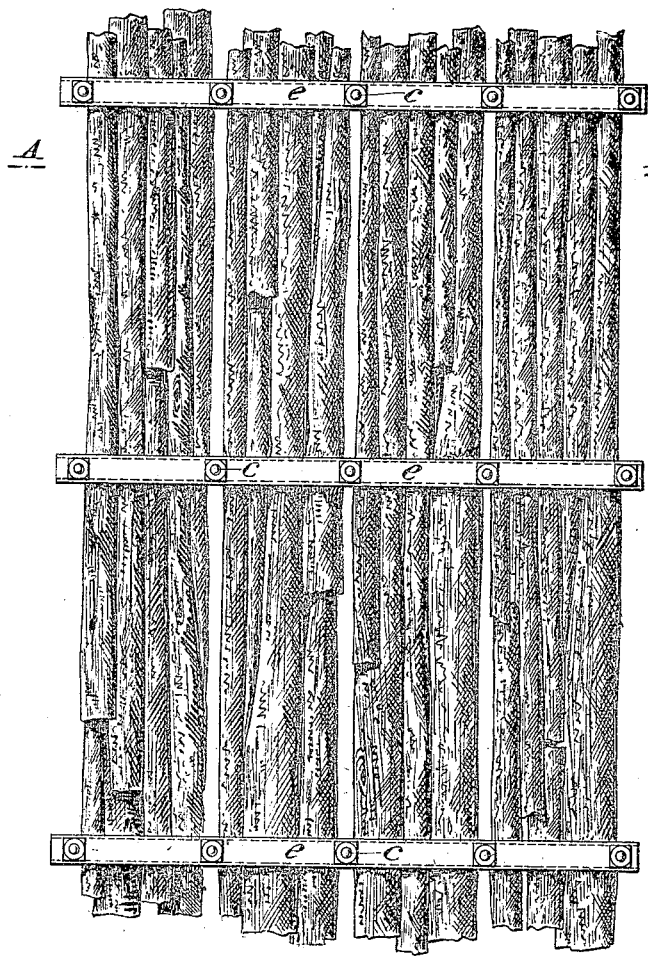
Witnesses:
M. A. Milord
L. G. Snow
Inventor.
Heinrich Butenschon.
by
Frederick Benjamin
Attorney.

UNITED STATES PATENT OFFICE.

HEINRICH BUTENSCHÖN, OF HOHENWESTEDT, GERMANY.

MEANS FOR FORMING FLOATS FROM LOGS OF WOOD.

No. 820,699.     Specification of Letters Patent.     Patented May 15, 1906.

Application filed August 22, 1904. Serial No. 221,702.

*To all whom it may concern:*

Be it known that I, HEINRICH BUTENSCHÖN, a subject of the German Emperor, and a resident of Hohenwestedt, Germany, have invented an Improved Means for Forming Floats from Logs of Wood, of which the following is a specification.

This invention relates to a means for forming floats or log-rafts, and comprises channel-irons and connecting-bolts whereby a certain number of logs of wood are formed into a float, so as to enable them to be floated down rivers.

In the annexed drawings, given by way of example, Figure 1 shows a cross-section of a log-raft on the line A B of Fig. 2. Fig. 2 is a plan view of a portion of a float or raft. Fig. 3 shows the union of a connecting-bolt and channel-irons.

The logs constituting a raft are held between series of oppositely-placed channel-irons $a$, the number whereof varies according to the length of the raft. To the channel-irons are connected the bolts $c$, which are pivoted at their lower ends on the transverse bolts $b$, which pass through the lower channel-irons. Catches or lugs $d$ are arranged on one side of the pivoted end of the bolts and bear against the irons $a$, when the bolts move in the direction of such lugs. In order to increase the rigidity of the connections, the lugs $d$ are placed sometimes at the right and sometimes at the left of the connecting-bolts. The logs are placed in the frames or compartments formed by the bolts maintained in their vertical position, and the horizontal channel-irons, and the nuts on the upper ends of the bolts are tightened, thereby clamping the logs between the upper and lower series of channel-irons.

Having now fully described my invention, what I claim, and desire to secure by Letters Patent, is—

1. Means for forming rafts of logs, consisting of a plurality of channel-irons arranged in an upper course and a lower course, bolts connecting the members of said courses of irons together, said bolts pivotally connected with the members of the lower course and passing through the members of the upper course and having nuts applied to their upper ends.

2. Means for forming rafts of logs, consisting of a plurality of channel-irons arranged in an upper course and a lower course, bolts connecting the members of said courses together, said bolts pivotally connected with the members of the lower course, means for limiting the pivotal action of said bolts in one direction, and means for locking said bolts to the members of the upper course.

In testimony whereof I have hereunto set my hand in presence of two witnesses.

HEINRICH BUTENSCHÖN.

Witnesses:
 Z. Y. GIOVANI,
 JLLIUS RÖPKE.